United States Patent [19]

Aoki et al.

[11] 4,075,664
[45] Feb. 21, 1978

[54] FACSIMILE SCANNING DEVICE

[75] Inventors: Ren Aoki; Mitsugu Fujiwara, both of Hanamaki; Tasaku Wada, Tokyo, all of Japan

[73] Assignee: Yamura Shinko Seisakusho Co., Ltd., Hanamaki, Japan

[21] Appl. No.: 770,784

[22] Filed: Feb. 22, 1977

[30] Foreign Application Priority Data

Mar. 4, 1976 Japan .............................. 51-23591

[51] Int. Cl.$^2$ .......................... H04N 1/10; H04N 1/24
[52] U.S. Cl. ............................... 358/286; 358/293; 358/901
[58] Field of Search ............... 358/286, 293, 901, 204, 358/294, 200

[56] References Cited

U.S. PATENT DOCUMENTS

| 3,553,366 | 1/1971 | Brouwer | 358/293 |
| 3,588,514 | 6/1971 | Simpkins | 358/901 |
| 3,956,587 | 5/1976 | Nelson | 358/901 |

Primary Examiner—Howard W. Britton
Attorney, Agent, or Firm—David G. Conlin

[57] ABSTRACT

A linear scanning device for a facsimile system comprises a carrier which carries a write-head and a read-head, mounted on a belt which is moved in both directions by a pulse motor. Said read-head is composed of the end of a flexible optical fibre assembly having an emission fibre for illuminating a spot on an original paper and a receiving fibre for detecting the reflected brightness of a cell in said illuminated spot. Said optical fibre assembly is supported near each end of the same by a bearing, thus said read-head can move linearly in accordance with the movement of said carrier.

3 Claims, 8 Drawing Figures

FACSIMILE SCANNING DEVICE

BACKGROUND OF THE INVENTION

The present invention relates to a mechanical scanning device for a facsimile system.

Many linear scanning devices for facsimile systems are already known. However, those prior arts have the disadvantage that their mechanical and optical systems are complicated, and require very accurate manufacturing. Further, the prior arts require a high quality motor, a high quality oscillator, and a complicated control circuit, thus the price of prior systems is rather high, and the operation and the maintenance of prior systems must be carried out by a skilled operator.

SUMMARY OF THE INVENTION

It is an object, therefore, of the present invention to overcome the disadvantages and the limitations of prior facsimile systems by providing a new and improved facsimile system.

According to the present invention, the linear scanning device comprises a carrier which carries a write-head and a read-head, the former linearly scans a printing paper and the latter linearly scans an original paper in both the directions. The printed pattern produced by said write-head is visible during the receiving operation. After every line is scanned either from left to right or from right to left, the original paper and/or the printing paper is moved by a predetermined length. The motor for the movement of the carrier is an ordinary pulse motor with small power consumption, and the pulse motor is controlled by a counter system having at least an up-down counter and a decoder. Said up-down counter can provide the cycloid characteristics of the movement of the pulse motor for facilitating the acceleration and the deceleration of the same.

BRIEF DESCRIPTION OF THE DRAWINGS

The foregoing and other objects, features, and attendant advantages of the present invention will be appreciated as the same become better understood by means of the following description and accompanying drawings wherein.

DETAILED DESCRIPTION OF THE PREFERRED EMBODIMENT

Figure 1:
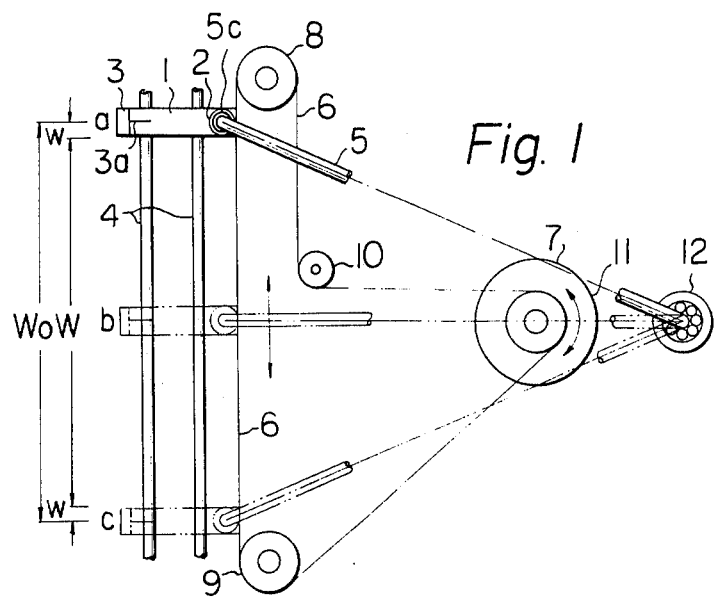
FIG. 1 is a plane view of the linear scanning device according to the present invention.
Figure 2A:
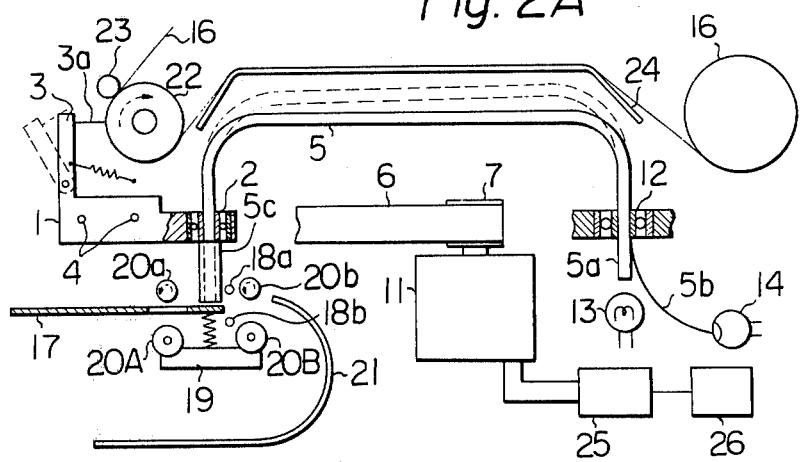
FIG. 2A and FIG. 2B are side views of the linear scanning device according to the present invention.
Figure 2B:
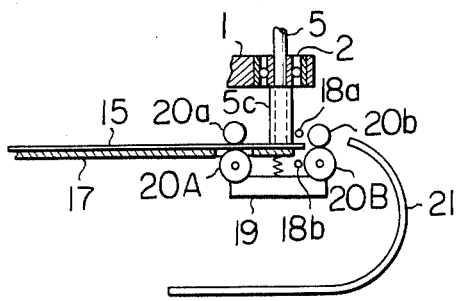

FIG. 1, FIG. 2A and FIG. 2B show the plane and side views of the facsimile apparatus according to the present invention. The carrier 1 is fixed to the belt 6, and can move the distance $Wo$ from position $a$ to position $c$ through position $b$ along a pair of guide rails 4. The carrier 1 is provided with the read-head 5c and the write head 3. During the movement of the carrier 1, said read-head 5c and said write-head 3 scan the effective width W of the original paper 15 and the printing paper 16, respectively, at a constant speed in both directions. The length $w$ is provided at both the ends of the distance $Wo$ at the positions $a$ and $c$ for the acceleration and deceleration of the carrier 1, and the formula $w = \frac{1}{2}(Wo - W)$ is satisfied. The belt 6 is held by the pulleys 7, 8 and 9 and the auxiliary pulley 10, and causes the carrier 1 to move the length $Wo$ in both the directions according to the alternate forward and backward revolution of the pulse motor 11 for the main scanning operation. The pulse motor 11 is diven by the control circuit 26 through the drive circuit 25, and moves the carrier 1 by the belt 6. The pulse motor 27 (FIG. 5) operates as an auxiliary scanning motor, and moves the papers 15 and 16 when the carrier 1 enters the area $w$ for acceleration and/or deceleration. Also, a synchronous signal is applied to the scanning signal when the carrier 1 enters the area $w$. The optical fibre assembly 5 is supported at both ends of the same by a pair of bearings 2 and 12, so that no undesirable stress is applied to the optical fibre assembly 5 during the movement of the carrier 1. The read-head 5c at the extreme end of the optical fibre assembly 5 is positioned near the surface of the original paper 15, the emission fibre 5a at the other end of the optical fibre assembly 5 is positioned so that it is exposed to the lamp 13, and the end of the receiving fibre 5b is positioned so that it is exposed to the photo-electric convertor 14. The optical fibre assembly 5 can move to the position shown by a dotted line in FIG. 2A so that the read-head 5c can move linearly while the other end of said optical fibre assembly is supported at one point by the bearing 12. The end 3a of the write-head 3 is held in contact with the printing paper 16 by spring pressure and scans the printing paper 16. Said write-head 3 is provided with a signal line (not shown) along the optical fibre assembly 5. The write-head 3 operates, on the principle of electrical discharge printing. The write head 3 can be removed to the position indicated by a dotted line when the present facsimile device operates as a facsimile transmitter and is not operating as a facsimile receiver. 24 is a guide plate for the printing paper 16.

The present facsimile device is normally in a receiving mode, and the carrier is stopped at the position (a), and the end 3a of the write-head 3 touches with the printing paper 16. In that mode, the original supply means 19 can not supply the original paper 15 since said means 19 is held below its operating position ( see FIG. 2A ) by a spring. When the synchronous signal is received in the receiving mode, the pulse motor 11 is driven by the control circuit 26 through the drive circuit 25, thus the carrier 1 begins operation. Upon receipt of the information signal succeeding said synchronous signal, said information signal is applied to the write-head 3, thus the information is recorded on the printing paper 16.

On the other hand, when the original paper 15 is inserted in the transmitting mode, the presence of said original paper 15 is detected by the detector 18 consisting of the lamp 18a and the beam receiving element 18b, and the original supply means 19 is moved toward the support plate 17 ( FIG. 2B ) by a magnet ( not shown ). Thus, a pair of capstans 20a, 20b and a pair of pinch-rollers 20A, 20B hold the original paper 15, and set the same at the proper position. Also, the write head 3 is removed to the stand-by position indicated by the dotted line, and the printing paper 16 is not supplied. The above operations are performed by a magnet (not shown). Upon detection of the original paper 15 by the detector 18, the pulse motor 11 is driven by the control circuit 26 and the drive circuit 25, the synchronous signal is transmitted, and the read head 5c scans the original paper 15. The optical signal produced by the scanning operation is applied through the optical fibre assembly 5 and the receiving fibre 5b to the photo-electric convertor 14, which transmitts the resultant electric signal to an external device. The reference numeral 21 is a guide plate for the removal of the original paper 15 after scanning.

In the test mode, both the read-head 5c and the write-head 3 are operational, also operational are the printing paper supply means 22 and 23, which rotate through a predetermined angle in the direction indicated by the arrow and supply the printing paper. In the test mode, the optical signal read out by the read-head 5c is converted to an electric signal by the photo-electric convertor 14, which applies the resultant electric signal to the write-head 3, thus the pattern on the original paper 15 is reproduced on the printing paper 16.

Figure 3:
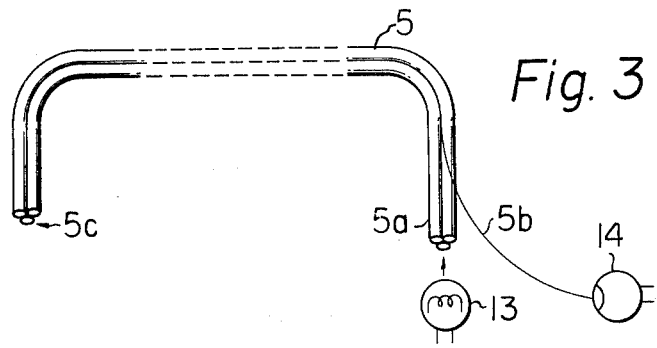
FIG. 3 shows the structure of an optical fibre assembly used in the present linear scanning device.

FIG. 3 shows the structure of the optical-fibre assembly 5, which comprises a plurality of thick emission fibers 5a and a thin receiving fibre 5b. The extreme end of the emission fibre 5a faces the lamp 13, and the extreme end of the receiving fibre 5b faces the photo-electric convertor 14. The extreme opposite end of both the emission fibre and the receiving fibre operates as the read-head 5c. The lamp 13 illuminates the surface of the original paper through the emission fibre 5a, and the receiving fibre 5b reads the reflected brightness from the original paper thus illuminated.

Figure 4:
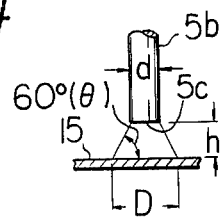
FIG. 4 is an explanatory view of the operation of said optical fibre assembly.

FIG. 4 shows an analysis of diameter-resolving power relationship of the receiving fibre 5b and the read-head 5c. Supposing that the diameter of the receiving fibre 5b is $d$ and the distance between the end of the receiving fibre 5b and the surface of the original paper 15 is $h$, then, the diameter D of the area where the read-head actually reads is shown below.

$$D = d + 2h \cot \theta$$

where $\theta$ is approximate 60° for an ordinary optical fibre. The resolving power of a facsimile system depends upon the value D. Of course the smaller D provides the better resolving power. It should be noted that the value $h$ can not be zero since a read-head with $h=0$ will be distorted by friction or friction heat. According to one of the practical embodiments, the values $d$ and $h$ are 0.1 mm. In that case $$D = 0.1 + 2 \times 0.1 \times (1/\sqrt{3}) \approx 0.22 \text{ mm } (\phi)$$

Thus the resolving power is approximate 5 lines/mm.

Figure 5:
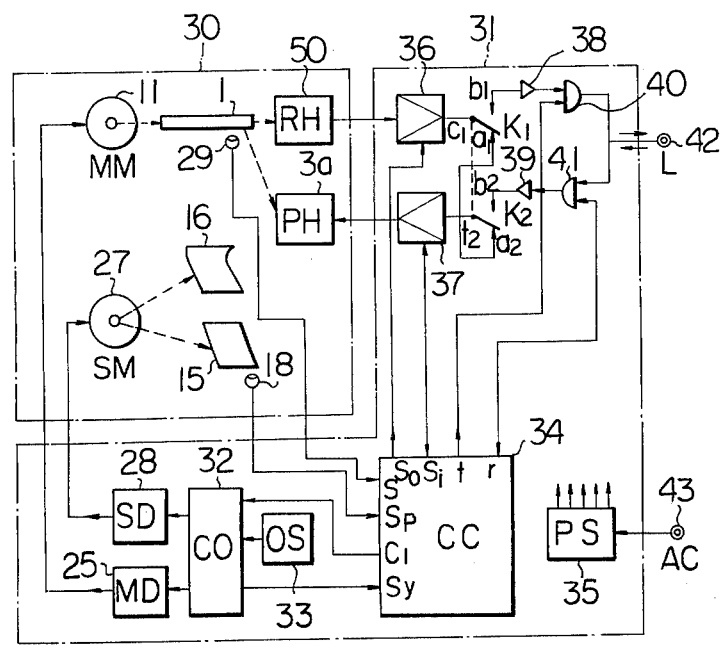
FIG. 5 is a blockdiagram of the electrical circuit of the present linear scanning device.

FIG. 5 shows a blockdiagram of the electrical circuit of the present facsimile system, in which the reference numeral 30 shows the mechanical means of the scanning device and 31 shows the electrical means for the control of the mechanical means 30 and processing the information signal. The carrier 1 including the read-head 5c and the write-head 3a is moved in both directions by the main scanning pulse motor 11. The extreme right and-/or left end of the movement of the carrier 1 is detected by the photo detector 29. The original paper 15 and/or the printing paper 16 is supplied intermittently by the pulse motor 27. The presence of the original paper 15 is detected by the detector 18 as mentioned before. When the terminals $t_1$ and $t_2$ of the ganged switches $k_1$ and $k_2$ are connected to the terminals $a_1$ and $a_2$, respectively, the facsimile system is in the test mode, and when $t_1$ and $t_2$ are connected to $b_1$ and $b_2$, respectively, the system is in the receiving or transmitting mode. The number of pulses for the movement of the pulse motor 11 in each scanning line is determined by the counter 32. The speed of the carrier 1 or the pulse motor 11 depends upon the output frequency of the oscillator 33. The counter 32 also controls the acceleration, the travel speed and the deceleration of the carrier 1, and generates the synchronous signal ( see FIG. 7, (6) ) between the stop position and the first pulse ( FIG. 7, (2) ). Said synchronous signal is applied to an external device through terminals $S_y$ and $S_O$ of the control circuit 34, which controls the sending and receiving operations and the movement of the carrier 1. The synchronous signal is generated for every scanning line of the carrier 1 in either direction, and succeeding the synchronous signal, the information signal is transmitted from the read-head 5c.

In the receiving mode, the received synchronous signal clears the content of the counter 32 through the control circuit 34 ( $S_i \rightarrow C_1$ ), and the drive circuit 25 starts the pulse motor 11. When the pulse motor 11 reaches the deceleration area ( $w$ in FIG. 1 ), the counter 32 starts the pulse motor 27 through the drive circuit 28, and the pulse motor 27 moves the original paper 15 or the printing paper 16 by a predetermined length.

In the transmission mode to an external facsimile system ( when the contacts $t_1$ and $t_2$ are connected to the contacts $b_1$ and $b_2$ respectively ), the detector 18 detects the presence of the original paper 15, and starts the pulse motor 11 through the control circuit 34 ( $S_p \rightarrow C_1$ ) and the drive circuit 25. Also the counter 32 applies a signal to the amplifier 36 through the control circuit 34 ( $S_y \rightarrow S_O$ ), and to the AND circuit 40 through the control circuit 34 ( $S_y \rightarrow 0 \ t$ ), thus, the synchronous signal is transmitted to an external communication line through the amplifier 36, the contact $t_1$, the contact $b_1$, the amplifier 38, the AND circuit 40, and the external terminal 42. And when the pulse motor 11 reaches its constant revolution speed, the information signal is sent out from the read-head 5c through the amplifier 36 to the external terminal 42. Next, when the counter 32 counts the predetermined number of pulses, the pulse motor 11 begins to decelerate, and the other pulse motor 27 moves the original paper by a predetermined length.

On the other hand, when the external terminal 42 receives a synchronous signal and an information signal, those signals are applied to the amplifier 37 through the AND circuit 41, the amplifier 39, the contact $b_2$ of the switch $k_2$, and the contact $t_2$, then, the synchronous signal clears the content of the counter 32 to zero through the control circuit 32 ( $S_i \rightarrow C_i$ ), and the succeeding information signal is applied to the write-head 3a, which records the recieved information on the printing paper. When the content of the counter 32 reaches a predetermined value, the pulse motor 11 begins to decelerate, and the other pulse motor 27 moves the printing paper 16 by a predetermined length. The reference numeral 43 is a power supply terminal which supplies the electric power through the power unit 35 to the various elements of the apparatus.

In the test mode where the contacts $t_1$ and $t_2$ of the switches $k_1$ and $k_2$ are connected to the contacts $a_1$ and $a_2$, respectively, the circuit from the contact $t_1$ of the switch $k_1$ to the contact $t_2$ of the switch $k_2$ through the contacts $a_1$ and $a_2$ is established, thus, the output of the transmission section is connected to the input of the receiving section, and a test transmission and reception are performed at the same time.

Figure 6:
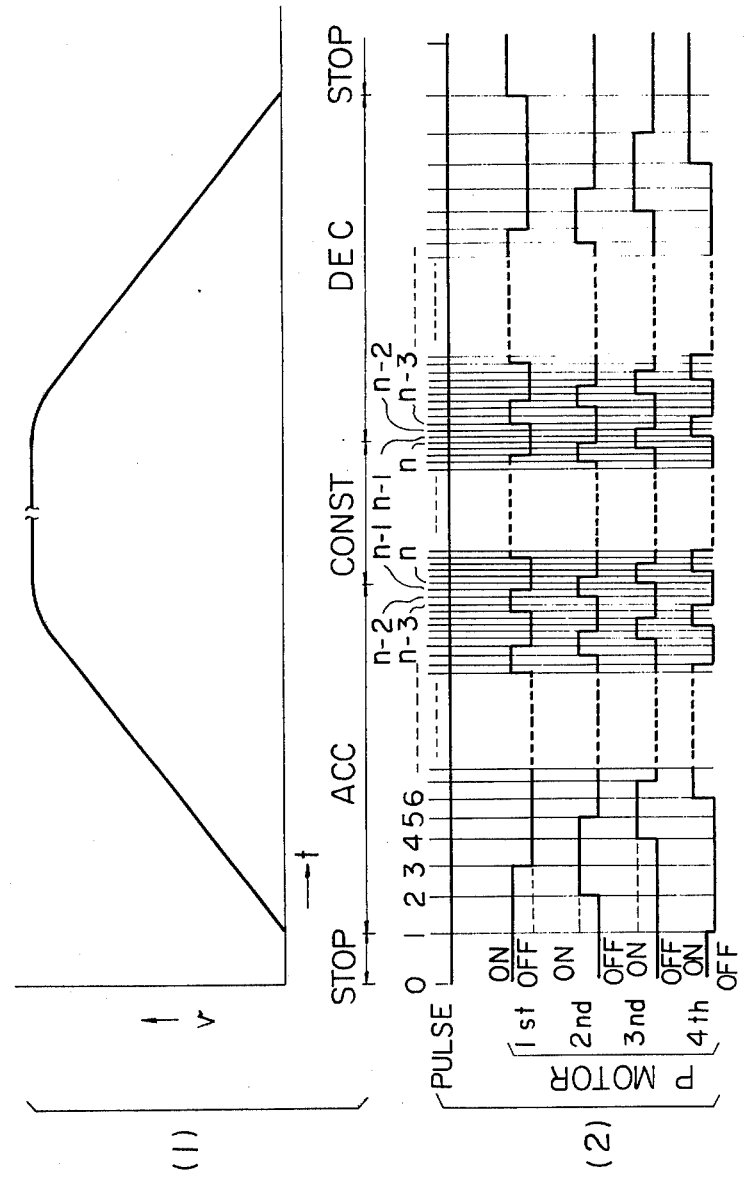
FIG. 6 is an operational time chart of the main scanning pulse motor according to the present invention.

FIG. 6 is an operational time chart of a pulse motor according to the present invention. Generally speaking, it takes some time for a pulse motor to reach a constant speed. The acceleration and deceleration of a pulse motor can be controlled by the pulse frequency or a time interval between each pulse applied to the same, thus the speed of a pulse motor can be arbitrarily controlled by the pulse frequency. The curve (1) in FIG. 6 shows the speed characteristics of a pulse motor where the horizontal axis shows time and the vertical axis shows speed. And the graph (2) show an example of the exciting signals and pulse signals for a four-phase pulse motor. When the pulse motor is stopped, only the first phase and the fourth phase coils are excited. When the pulse motor is accelerated, the pulse 1 is applied to the first phase coil, the pulse 2 is applied to the first phase and the second phase coils, the pulse 3 is applied to the second phase coil, the pulse 4 is applied to the second phase and the third phase coils, the pulse 5 is applied to the third phase coil, the pulse 6 is applied to the third phase and the fourth phase coils, and the above operation is repeated. When the pulse motor rotates in the opposite direction, the sequence of excitation pulses is reversed. As the time interval between each pulses is shortened, the pulse motor is accelerated, and reaches a constant speed when the $n$'th pulse is applied to the pulse motor. Then, the constant speed is maintained by the constant time interval of the pulses. Next as the time interval between the pulses is increased, the pulse motor is decelerated and finally stopped. Thus, the first scanning cycle is completed, and the above operation is continued.

Figure 7:
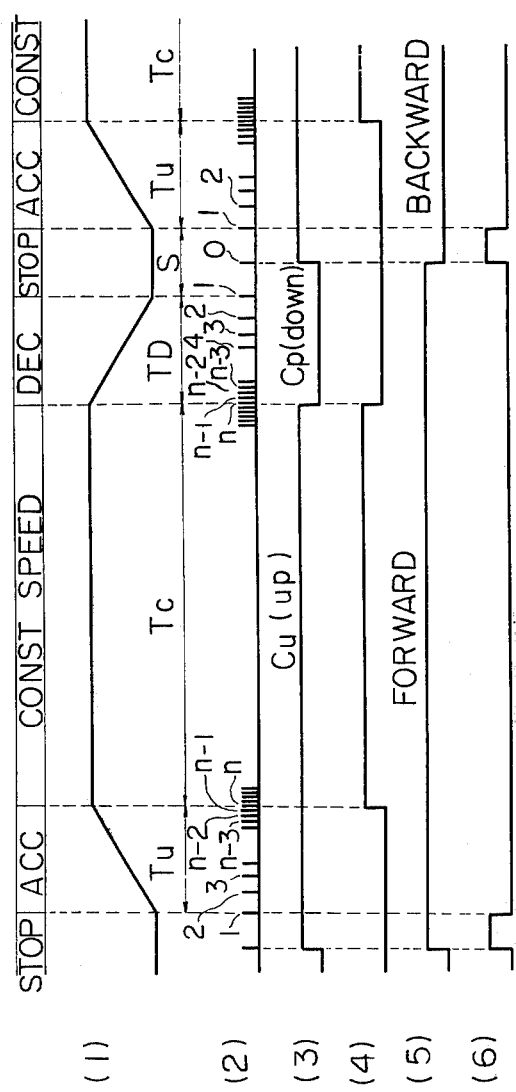
FIG. 7 is a time chart of the operation of the present scanning device.

FIG. 7 shows a time chart of the operation of the present scanning device. The curves (1) and (2) show the speed of the pulse motor and the pulses applied to the same, respectively, and are already explained in accordance with FIG. 6. It should be appreciated that the movement of the pulse motor coincides with that of the carrier 1 which carries the read-head 3 and the write-head 5c, since the carrier 1 is directly driven by the pulse motor. As the pulse motor reaches constant speed through the acceleration region, stops through the deceleration region, and repeats the same sequence again in the apposite direction, the carrier 1 scans in both directions. The counter 32 is composed of an up-counter, constant-speed-counter, and a down-counter. The curve (3) in FIG. 7 shows the operation of the up-counter and the down-counter, and the curve (4) in FIG. 7 shows the operation of the constant-speed-counter. The revolutional direction of the pulse motor 11 is controlled by a flip-flop (not shown), which operates as shown in the curve (5) in FIG. 7. The curve (6) in FIG. 7 shows the synchronous signal, which appears between the stop region of the pulse motor and the first pulse 1 applied to the pulse motor. Said synchronous signal clears the counter 32 to zero on the receiving side in receiving mode, and initiates the faisimile device in the receiving mode. Accordingly, the receiving side of the counter is synchronized with the transmission side for every scanning line, therefore, there can be no accumulation of synchronization error.

As explained above in detail, the present linear scanning system with simple structure, low manufacturing cost and small size, provides a facsimile system of high quality and simple operation. Some of the particular advantages of the present invention are (1) infinite longitudinal length of the original paper is possible; (2) the printing paper is in roll form and provides continuous receiving operation, (3) the recieved pattern is visible as it is being recorded, (4) the complete synchronous system provides perfect synchronization from the first scanning line, (5) operation is very simple and the device may be started by simply inserting the original paper. (6) the power consumption is small, and (7) the device can double as a duplicator in the test mode.

From the foregoing it will now be apparent that a new and improved facsimile system has been found. It should be understood of course that the embodiment disclosed is merely illustrative and is not intended to limit the scope of the invention. Reference should be made to the appended claims, therefore, rather than the specification as an indication of the scope of the invention.

Finally, the reference numerals referred to in the specification are listed below.

| | |
|---|---|
| 1; carrier | 2; bearing |
| 3; write-head | 4; guide rail |
| 5; optical fibre assembly | 5a; emission fibre |
| 5b; receiving fibre | 5c; read-head |
| 6; belt | 7; pulley |
| 8; pulley | 9; pulley |
| 10; auxiliary pulley | 11; pulse motor |
| 12; bearing | 13; lamp |
| 14; photo-electric convertor | |
| 15; original paper | 16; printing paper |
| 17; support plate | 18; detector |
| 18a; lamp | 18b; beam receiving element |
| 19; original supply means | 20a, 20b; capstan |
| 20A, 20B; pinch roller | 21; guide plate |
| 22, 23; printing paper supply means | |
| 24; guide plate | 25; drive circuit |
| 26; control circuit | 27; pulse motor |
| 28; drive circuit | 29; photo detector |
| 30; mechanical means | 31; electrical means |
| 32; counter | 33; oscillator |
| 34; control circuit | 35; power unit |
| 36; amplifier | 37; amplifier |
| 38; amplifier | 39; amplifier |
| 40; AND circuit | 41; AND circuit |
| 42; external terminal | 43; power supply terminal |

What is claimed is:

1. A linear scanning system for a facsimile system comprising; a carrier movable linearly in both directions supported on a belt, a pulse motor engaged with said belt, a write-head mounted on said carrier, an optical fibre assembly composed of at least one thick emission fibre and a thin receiving fibre, a read-head composed of the end of said optical fibre assembly, a lamp positioned at the other end of said emission fibre, a photo-electric convertor positioned at the end of said receiving fibre, a bearing positioned on a center line perpendicular to the direction of travel of said carrier and said carrier supporting said optical fibre assembly near said other end, and said carrier being controlled to scan an original paper and a printing paper in both directions.

2. The invention as defined in claim 1, wherein said write-head operates on an electrical discharge principle.

3. The invention as claimed in claim 1, wherein said optical fibre assembly has three emission fibres and a single receiving fibre.

* * * * *